United States Patent Office 2,730,451
Patented Jan. 10, 1956

2,730,451

DRYING OIL PRODUCT AND METHOD OF PRODUCING

David Aelony, Minneapolis, Minn., assignor to General Mills, Inc., a corporation of Delaware No Drawing. Application April 7, 1952,
Serial No. 281,040

9 Claims. (Cl. 106—252)

The present invention relates to a drying oil product which is the reaction product of a conjugated drying oil and substituted benzodioxanes 1-3.

Conjugated drying oils, such as China-wood oil, oiticica oil and perilla oil, are excellent varnish oils in that they have fast drying rates. In their unmodified condition, however, these conjugated oils dry to a wrinkled and frosty finish. To avoid the production of this type of finish it is generally necessary to cook conjugated oils with from 20% to 40% of their weight of soluble phenolic resins. Films produced from these varnishes are clear but have a tendency to be too hard and too brittle for many applications. It has now been discovered that by heating conjugated oils with substituted benzodioxanes 1-3 the resultant product dries to a film which is clear and not wrinkled. Furthermore the films are hard but are not brittle.

It is therefore an object of the present invention to provide a novel drying oil product composed of a conjugated drying oil and substituted benzodioxanes 1-3.

It is another object of the present invention to provide a process of producing such a drying oil product.

The substituted benzodioxanes suitable for the present invention are those described in the copending application of Stuart A. Harrison, Serial No. 262,499, filed December 19, 1951, entitled Substituted Benzodioxanes. These substituted benzodioxanes have the following formula:

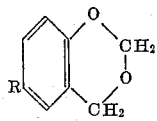

in which R is a hydrocarbon group containing from 1 to 10 carbon atoms and may be either aliphatic or aromatic. Typical of the benzodioxanes which may be employed in the present invention are 6-t-butyl benzodioxane 1-3, 6-methyl benzodioxane 1-3, 6-nonyl benzodioxane 1-3, 6-isopropyl benzodioxane 1-3, 6-t-amyl benzodioxane 1-3, 6-cumyl benzodioxane 1-3, and 6-phenyl benzodioxane 1-3.

As disclosed in said Harrison application these compounds may be produced by reacting a para-substituted phenol such as para-tertiary-butyl-phenol at an elevated temperature such as 160° C. in an autoclave with formaldehyde to produce the substituted benzodioxane as an oily by-product in conjunction with the phenolic resin. The benzodioxane may be recovered by vacuum distilling the reaction mixture to yield a distillate composed of water and an oil, the latter being composed of the desired product and a minor proportion of unreacted phenol.

From 5% to 40% of the substituted benzodioxane may be employed based upon the combined weight of the drying oil and the benzodioxane. The process involves the introduction of the substituted benzodioxane to the conjugated drying oil; the benzodioxane is readily miscible with the oil at room temperature. If desired, at least some of the benzodioxane may be caused to combine with the oil by heating the mixture to 200-250° C. for time periods of from 30 to 60 minutes. The products of the present invention not only eliminate the frosty and wrinkled finish of films prepared from the composition, but furthermore provide a means of controlling gelation in the varnish kettle. When conjugated drying oils are cooked there is a distinct tendency for gelation to occur due to polymerization. This is frequently avoided to some extent by dilution with other materials. The substituted benzodioxanes, however, do not involve merely a dilution phenomenon but actually reduce the gelation tendency by some reaction with the conjugated drying oil. To demonstate this fact, the following experiment was run:

China-wood oil was mixed with varying quantities of 6-t-butylbenzodioxane 1-3 and also with various proportions of mineral oil. The Browne heat test was then run on these mixtures and the comparative increase in gel time is indicated in the following table:

| Percent CWO | Percent bensodioxane | Gel Time, Min. | Percent Mineral Oil | Gel Time, (Min.) |
|---|---|---|---|---|
| 100 | 0 | 10¼ | 0 | 10½ |
| 90 | 10 | 14¼ | 10 | 12.0 |
| 80 | 20 | 37½ | 20 | 15½ |
| 70 | 30 | 72 | 30 | 20½ |
| 60 | 40 | 7,200 | 40 | 31.0 |

These data show that at about 10% concentration of benzodioxane the gel time begins to increase rapidly, whereas the mineral oil appears to function essentially on the basis of dilution. Usually it is not necessary to employ benzodioxane in a concentration in excess of 40%.

*Example 1*

120 grams of China-wood oil and 30 g. of 6-t-butylbenzodioxane 1-3 were heated at 230–240° C. for 30 minutes. 30 grams of the product was then mixed with 20 g. of mineral spirits and 3 cc. of a solution containing 3% Pb and 0.6% Co as naphthenates were added as a drier. A 0.003" film was then applied from this solution to glass and tin plates. The films dried to no transfer in 30 minutes, and dried through in 1 hour. The films became tack free to foil in 8 to 24 hours, and had a Sward hardness in 24 hours of 8, and of 10 in 7 days. The films were clear and not wrinkled.

*Example 2*

1.5 grams of benzodioxane 1-3, 28.5 g. of tung oil, 20 g. of mineral spirits, and 3 cc. of a solution containing 3% Pb and .6% Co as naphthenates were mixed and allowed to stand overnight at room temperature. The solution was then applied to tubes and plates and dried to no transfer in 1 hour. The films dried through in less than 4 hours and were tack free to foil in less than 4 hours. Hardness in 24 hours was 8. The films were clear and not wrinkled.

*Example 3*

85 grams of tung oil and 15 g. of 6-t-butylbenzodioxane 1-3 were heated at 230–240° C. for 30 minutes under an atmosphere of nitrogen. 30 g. of the product were mixed with 20 g. of mineral spirits and 3 cc. of a solution containing 3% Pb and .6% Co as naphthenates were added. The solution was applied to tubes and plates which dried to no transfer in less than 55 minutes; dried through in 2½ hours. The hardness after 24 hours was 4, and after 7 days, 6. The films were clear and not wrinkled. Films prepared from a 60% solution of untreated tung oil in mineral spirits dried to no transfer in 70 minutes, but were frosty and wrinkled and had practically no adhesion to glass.

Example 4

60 grams of tung oil and 40 g. of 6-t-butylbenzodioxane 1-3 were heated at 230–240° C. for 30 minutes under an atmosphere of nitrogen. 30 g. of the product were dissolved in 20 g. of mineral spirits and 3 cc. of a solution containing 3% Pb and .6% Co as naphthenates were added. The solution was applied to plates and tubes and the films dried to no transfer in 1½ hours and dried through in 2¼ hours. The films neither wrinkled nor frosted.

58 grams of the above product were stripped to a temperature of 240° C. at 10 mm. A fairly viscous colorless liquid distilled over, the distillate weighing 18 g. 30 g. of the residue were mixed with 20 g. of mineral spirits and 3 cc. of a solution containing 3% Pb and .6% Co as naphthenates were added. The solution was applied to tubes and plates which dried to no transfer in less than 40 minutes and dried through in 1 hour 25 minutes. The hardness after 24 hours was 4, and after 7 days was 8. The films were neither wrinkled nor frosted.

In place of the China-wood oil employed above, other conjugated drying oils may be employed such as oiticica oil and perilla oil, and similar results are obtained.

I claim as my invention:

1. Process which involves heating a conjugated drying oil with a benzodioxane 1-3, substituted in the 6-position with a hydrocarbon substituent containing from 1–10 carbon atoms, at temperatures of from 200–250° C. for from 30 to 60 minutes, the substituted benzodioxane being employed in a concentration of 5% to 40% based on the combined weight of the substituted benzodioxane and the conjugated drying oil.

2. Process which involves heating a conjugated drying oil with a benzodioxane 1,3, substituted in the 6-position with a hydrocarbon substituent containing from 1–10 carbon atoms, at temperatures of from 200–250° C. for from 30 to 60 minutes, the substituted benzodioxane being employed in a concentration of approximately 20% based on the combined weight of the substituted benzodioxane and the conjugated drying oil.

3. Process which involves heating China-wood oil with a benzodioxane 1,3, substituted in the 6-position with a hydrocarbon substituent containing from 1–10 carbon atoms, at temperatures of from 200–250° C. for from 30 to 60 minutes, the substituted benzodioxane being employed in a concentration of 5% to 40% based on the combined weight of the substituted benzodioxane and the China-wood oil.

4. Process which involves heating China-wood oil with a benzodioxane 1-3, substituted in the 6-position with a hydrocarbon substituent containing from 1–10 carbon atoms, at temperatures of from 200–250° C. for from 30 to 60 minutes, the substituted benzodioxane being employed in a concentration of approximately 20% based on the combined weight of the substituted benzodioxane and the China-wood oil.

5. Process which involves heating China-wood oil with 6-tertiary-butylbenzodioxane 1-3 at temperatures of from 200–250° C. for from 30 to 60 minutes, the substituted benzodioxane being employed in a concentration of approximately 20% based on the combined weight of the substituted benzodioxane and the China-wood oil.

6. A drying oil product comprising a solution of the conjugated drying oil and a benzodioxane 1-3, substituted in the 6-position with a hydrocarbon substituent containing from 1–10 carbon atoms, the substituted benzodioxane being employed in a concentration of from 5% to 40% based on the combined weight of the conjugated drying oil and the substituted benzodioxane.

7. A drying oil product comprising a solution of China-wood oil and a benzodioxane 1-3, substituted in the 6-position with a hydrocarbon substituent containing from 1–10 carbon atoms, the substituted benzodioxane being employed in a concentration of from 5% to 40% based on the combined weight of the China-wood oil and the substituted benzodioxane.

8. A drying oil product comprising a solution of China-wood oil and a benzodioxane 1-3, substituted in the 6-position with a hydrocarbon substituent containing from 1–10 carbon atoms, the substituted benzodioxane being employed in a concentration of approximately 5% based on the combined weight of the China-wood oil and the substituted benzodioxane.

9. A drying oil product comprising a solution of China-wood oil and 6-tertiary-butylbenzodioxane 1-3, the substituted benzodioxane being employed in a concentration of approximately 5% based on the combined weight of the China-wood oil and the substituted benzodioxane.

References Cited in the file of this patent

UNITED STATES PATENTS

| | | |
|---|---|---|
| 2,022,301 | Sibley | Nov. 26, 1935 |
| 2,047,150 | Koenig et al. | July 7, 1936 |
| 2,510,036 | Mowry | May 30, 1950 |
| 2,563,873 | Rust et al. | Aug. 14, 1951 |
| 2,588,821 | Geiger | Mar. 11, 1952 |

OTHER REFERENCES

"Chemistry in the Evolution of the Modern Varnish Industry," Kappelmeier Paint, Oil and Chemical Review, July 7, 1949, pages 18, 20, and 28.